United States Patent [19]
Audebert et al.

[11] Patent Number: 5,594,050
[45] Date of Patent: Jan. 14, 1997

[54] CEMENT COMPOSITION CONTAINING CHEMICALLY CROSSLINKED POLYVINYL ALCOHOL (PVA)

[75] Inventors: Roland Audebert, Saint-Leu-La-Foret; Joseph Janca, La Rochelle; Pierre Maroy, Buc; Hugo Hendriks, Grenoble, all of France

[73] Assignee: Dowell Schlumberger Incorporated, Sugar Land, Tex.

[21] Appl. No.: 622,021

[22] Filed: Mar. 27, 1996

Related U.S. Application Data

[63] Continuation of Ser. No. 514,514, Aug. 11, 1995, abandoned, which is a continuation of Ser. No. 226,213, Apr. 11, 1994, abandoned.

[30] Foreign Application Priority Data

Apr. 23, 1993 [FR] France .................................. 93 04925

[51] Int. Cl.$^6$ ......................................................... C04B 7/00
[52] U.S. Cl. ........................................ 524/5; 524/2; 524/6
[58] Field of Search ............................................. 524/5, 6

[56] References Cited

U.S. PATENT DOCUMENTS

| | | | |
|---|---|---|---|
| 4,363,667 | 12/1982 | Birchall et al. | 524/5 |
| 4,411,800 | 10/1983 | Green et al. | 166/270 |
| 4,490,540 | 2/1985 | Marrocco | 166/295 |
| 4,569,395 | 2/1986 | Carpenter | 524/5 |
| 4,896,723 | 1/1990 | Hoskin et al. | 166/272 |
| 4,940,090 | 7/1990 | Hoskin et al. | 166/270 |
| 5,009,269 | 4/1991 | Moran et al. | 166/293 |

FOREIGN PATENT DOCUMENTS

| | | |
|---|---|---|
| 2125860 | 3/1984 | United Kingdom . |
| 8600330 | 1/1986 | WIPO . |

*Primary Examiner*—Tae Yoon
*Attorney, Agent, or Firm*—John E. Vick, Jr.

[57] ABSTRACT

The invention relates to a new, chemically crosslinked PVA. Its application is that of a fluid loss control agent in fluids used in the oil industry, in particular cement slurries, separating fluids, or "spacers", and drilling muds. Its advantages are that it does not delay the setting of the cement, that it has high temperature properties that are relatively insensitive to external conditions.

8 Claims, No Drawings

CEMENT COMPOSITION CONTAINING CHEMICALLY CROSSLINKED POLYVINYL ALCOHOL (PVA)

This application is a file wrapper continuation of U.S. application Ser. No. 08/514,514 filed Aug. 11, 1995, now abandoned, which is in turn a file wrapper continuation of U.S. application Ser. No. 08/226,213 filed Apr. 11, 1994, now abandoned.

The invention relates to the field of cementing the annuluses of oil, water, gas, geothermal and analogous wells and to the field of drilling and of mud and cement separating fluids or "spacers", and, more particularly, to an improved fluid loss control agent.

Such operations are very well known to a man of the art, both as regards their principle and as regards their performance; the major difficulties encountered in performing them are also well known.

It is thus completely unnecessary to set out this information herein. The essentials only will be briefly outlined herebelow.

Generally speaking, the operation of cementing a well consists in preparing, on the surface, a cement slurry, which is then pumped under pressure into the metal tubing or "casing". The slurry, thus pumped down to the bottom hole, drives out the drilling mud, which rises to the surface (where it is discharged) through the annulus, that is to say the space between the borehole and the tubing or "casing".

The cement slurry is, itself, propelled by an inert fluid, the pumped volumes being calculated in such a way that pumping is halted when the slurry has replaced the mud in the annulus, while the interior of the tubing contains an inert fluid. The cement slurry is then allowed to set and harden in the annulus. It then performs a dual function: that of insulating the different underground areas and that of mechanically supporting the tubing.

It will thus be clear that, in order to perform such an operation successfully, it is of prime importance to control the rheological properties of the slurry.

It is also essential to control the very numerous parameters: fluid loss, free water, settling, cement thickening time ("TT"), compressive strength development, particularly when setting commences, etc., control over the permeability of the cement to the fluids that degrade it, etc.

It will thus also be clear that, given the temperature and pressure cycle undergone by the cement slurry, that is to say surface ==> bottom ==> surface, which is entirely specific to the industry in question, the aforegoing is an extremely delicate matter.

In addition, it is also very important to adjust correctly the density of the cement slurry in order to ensure hydrostatic equilibrium. If density is too low, there is a risk of damaging intrusions by external fluids. If, on the contrary, density is too high, there is a risk of the rock fracturing, with serious consequences. Such risks, and the vital requirements that derive therefrom, are also very specific to the industry under consideration. Again, all this is well known to a man of the art.

There are also known very numerous additives of all types that a man of the art uses alone or in various combinations to design the best possible slurry for a given well.

The design of a slurry is never easy. It is often imperfect, as many of the requisite properties necessitate the use of antagonistic means.

Furthermore, there always remains a certain amount of uncertainty as to the bottom hole conditions, for example the maximum temperature, the presence of cracks, etc. Such uncertainties lead a man of the art, for example, to overdose a given additive in order to forestall a given major risk.

As a result, slurry design is highly complex. When conducting a cementing operation, it is essential to separate the drilling mud physically from the cement slurry, for reasons of chemical incompatibility. Use is made either of mechanical devices, or of inert separating fluids or "spacers".

These fluids perform two main functions, the first being to "displace" the drilling mud efficiently, and the second being to prevent any contact between the cement and the mud. Here again, rheological, density and velocity profile characteristics are of vital importance, as are fluid loss control and stability or settling control.

The fluid loss control property is also important in connection with drilling fluids. Drilling fluids, in particular drilling muds, are well known. These are laden fluids which must also have very precise characteristics in terms of rheology and density. Apart from lubrication of the drill bit and evacuation of the cuttings to the surface, drilling muds perform an essential function, of a hydrostatic nature, aimed, in particular, at preventing natural gases from rising to the surface, which would give rise to a disastrous "blow-out".

The function of one additive commonly used, fluid loss control agent, is to forestall, prevent or at least limit as far as possible, fluid losses that may be sustained by the cement slurry during its placement and pending its setting.

This phenomenon is also well known. When the cement slurry, or other fluid used in the oil industry, is placed in contact with a more or less porous, or cracked natural formation, the fluid that is one of the constituents of the slurry, or another fluid used in the oil industry, will have a natural tendency to penetrate such areas, in which it will be lost.

This phenomenon will, of course, seriously affect the properties expected of the slurry, by drying it up, and it may even jeopardize the entire operation.

In the prior art, use has most often been made of cellulose derivatives (for example hydroxyethyl cellulose or "HEC"), which are advantageous on account of their low cost and acceptable efficiency.

Unfortunately, these cellulose derivatives have the drawback of retarding the setting of the cement, very considerably, at low temperatures. In addition, their range of activity is confined to approximately 90° C. (approximately 194° F.).

More recently, AMPS based copolymers have been introduced. These products are efficient at temperatures far higher than 90° C. (194° F.), and some of them do not significantly retard the setting of the cement at low temperatures. However, these products are very costly, whereas cost cutting has been a vital requirement for almost ten years now.

Finally, the fluid loss control mechanisms brought into play by these polymers are such that they merely reduce the fluid loss rate, without halting the process. This results in an undesirable invasion of the formation by polymer-laden filtrate.

Again in the prior art, use is made of certain polyvinyl alcohols (hereinafter referred to as "PVA"). These additives are inexpensive and do not retard setting. However, their efficiency has proved to be substantially limited in terms of reproducibility, performances and stability. In particular, they cannot be used above approximately 50° C. (approximately 120° F.).

U.S. Pat. No. 4,569,395 proposes a more hydrolized PVA (high ratio of vinyl alcohol to vinyl acetate). However, simply to operate at approximately 95° C. (203° F.) it is necessary to add a conventional HEC, with its attendant drawback of retarding setting.

U.S. Pat. No. 5,009,269 describes the use of gels obtained "physically" from PVA and from crosslinking agents such as borax, boric acid, titanates and zirconates. The crosslinked PVA has to be activated "physically", using calcium sulphate. These PVA's offer very poor temperature stability. Furthermore, it is never desirable to introduce destructive ions such as $Ca^{++}$.

The above two products again have the disadvantage of not being usable in powder form, which is completely at variance with accuracy in mixing.

Finally, U.S. Pat. No. 4,411,800 describes the use of a "chemically" crosslinked PVA. However, the proportion of crosslinking agent in relation to vinyl alcohol is very high, and the patent specifies that this crosslinked PVA does not have any intrinsic fluid loss control activity. On the contrary, a clay and an agent capable of being oxidized, of a type such as alcohol, mercaptan, metal at its lower oxidation level ($Fe^{++}$, $Cu^+$) or the salt of a reducing acid (sulphurous acid, nitrous acid, etc.) and other reducing agents obvious to a man of the art are absolutely essential.

Furthermore, the teaching of this patent consists in the use of solid PVA (in powder form) suspended, highly concentrated, in water. The crosslinking agent used in a large quantity then forms a surface crosslinked layer over the particles of PVA, which are rendered insoluble.

To sum up, the crosslinked PVA approach was attempted in the prior art, but without any significant degree of success as regards the "physical" crosslinking approach, and even a total absence of activity being noted in the "chemical" crosslinking approach.

Despite these setbacks, the invention has succeeded in providing a fluid loss control agent of the chemically crosslinked PVA type (hereinafter referred to as "CH-X-PVA") which not only is active, and active alone, contrary to the teachings of the prior art, but also has the properties vainly sought after in the three U.S. Pat. Nos. '395, '269 and '800 aforementioned.

Indeed, the CH-X-PVA according to the invention gives excellent fluid loss control at a concentration of approximately 0.05% to 1% by weight of cement ("BWOC") and up to temperatures in the order of 120° C. (250° F.).

The settling of the cement is not significantly retarded, the stability and the reproducibility of the properties are very good and, finally, this product can be used in a liquid state (preferably) or, indifferently, in powder (if necessary), after atomization and drying of the liquid, (or "spray drying"). No co-agent is required.

Finally, the new additive is efficient in small proportions, and is thus very surprisingly competitive with the usual cellulose products, while, at the same time, offering advantages that are greater than those of the costly polymer products of the prior art.

The invention will be more readily understood upon reading the following description.

Without wishing to be tied down to a theory, it would appear that the production of properties differing from, or even contrary to, the teachings of the prior art and, in particular, of U.S. Pat. No. 4,411,800, is the resultant of very different crosslinking mechanisms. It would, indeed, seem that the properties surprisingly obtained according to the invention are due to the production of a microgel structure resulting from the action of the crosslinking agent on a diluted solution of the PVA. The result is a product with a low concentration of PVA in a large quantity of water, which is the opposite of what is taught in U.S. Pat. No. 4,411,800, and of remarkable efficiency in fluid loss control. The invention also applies to separating fluids (or "spacers") which are traditionally pumped between the cement slurry and the drilling mud, in order to prevent them from coming into contact.

The invention further applies to drilling fluids or drilling muds, as well as to the fluids used in the oil industry which will be readily apparent to a man of the art.

According to the invention, the chemical crosslinking of the PVA can be initiated by reacting the PVA with di or poly-functional agents that bring about condensation with the alcohol groups (primary, secondary or tertiary). A di or poly-functional crosslinking agent may be referred to herein as a multi-functional crosslinking agent.

Such agents are, in particular, different aldehydes, such as formaldehyde, acetaldehyde, glyoxal and glutaraldehyde, as well as maleic acid, oxalic acid, dimethylurea, polyacroleines, diisocyanates, divinyl sulphate and the chlorides of diacids and other difunctional products capable of condensing on at least two alcohol functions at a pH <10.

Preferably, the CH-X-PVA according to the invention will be synthesized by crosslinking the PVA in a diluted aqueous solution, having a molecular weight of 30,000 to 250,000, the glutaraldehyde (GA), with controlled stirring, at a pH<5, and preferably between 3 and 4 for technical reasons, at a temperature of less than 150° C. (300° F.) and preferably between 50° and 100° C. (120° and 210° F.).

The molar concentration of crosslinking agent can be varied in relation to the monomer residues of the PVA between approximately 0.01% and 1%, preferably between approximately 0, 1% and 0.5%.

The following examples illustrate the invention without, however, limiting the scope thereof.

EXAMPLE 1 OF SYNTHESIS OF CH-X-PVA ACCORDING TO THE INVENTION

The initial polymer is a commercially available PVA having a hydrolysis rate of approximately 88% in moles, and a molecular weight (determined using Ubbelohde viscosity) of approximately 160,000.

A solution of 130 g of this PVA is prepared in 1500 ml of water. The solution is stirred for 24 hours at 80°–90° C. (176°–194° F.). It is cooled to approximately 50° C. (120° F.), 1.94 ml of a 25% solution of GA are added and stirring is continued for one hour. While continuing to stir, 150 ml of HCl 1N are added; after 3 minutes, stirring ceases owing to the formation of a gel. After 24 hours, the gel is mechanically crushed, a sufficient quantity of water being added to reach a final polymer concentration of 2.6%.

By way of a variant, the PVA solution containing the GA can also be diluted before adding acid. The solution is then acidified with vigorous stirring. In this case, the aggregates are formed in suspension, and no mechanical crushing is required.

The synthesis described above, as well as its variant, results in a CH-X-PVA having a theoretical crosslinking rate of 0.19% (i.e. 0.0019 mole of GA per mole of PVA monomer residue).

EXAMPLE 2 OF SYNTHESIS OF CH-X-PVA ACCORDING TO THE INVENTION

In another variant of CH-X-PVA synthesis, a solution of 24 g of PVA in 576 g of water is prepared and heated to 60° C. 0.50 ml of a 25% solution of GA are added and the solution is stirred for 30 minutes. While stirring continues, 15 ml of 0.1M HCl are added. After one hour's stirring, 50 ml of 0.1M NaOH are added. This synthesis results in a CH-X-PVA having a theoretical crosslinking rate of 0.27%.

It was observed, during the different laboratory tests, that a critical parameter as regards the fluid loss control properties of the CH-X-PVA according to the invention is the crosslinking rate. Another factor having relevance to these properties is the grain size distribution of the particles of gel of the CH-X-PVA in suspension in the fluid in question.

FLUID LOSS CONTROL

In these examples, fluid loss control was measured according to the standards of the API (American Petroleum Institute) well known to a man of the art and, in particular, API standards section 10, 5th. Edition, July 1990.

EXAMPLE A (cement slurries)

The cement slurries were prepared using a class G API cement, at a density of 1.9 g/cm$^3$ (15.8 ppg).

A conventional cement setting retarder, of the lignosulphonate type, was used.

The results are grouped together in Table I hereinafter.

The crosslinking rate of 0% corresponds to a conventional PVA of the prior art, in powder form, which ceased to have an activity above approximately 50° C. (120° F.), and cannot be used in solution.

All the other tests were conducted with suspensions of CH-X-PVA, at different crosslinking rates, this additive according to the invention being added to the water or to the mix fluid (mix water), before the cement was added.

The results in this Table I show that the CH-X-PVA according to the invention permits good, or very good, fluid loss control, at small concentrations, and is efficient at temperatures at which a conventional PVA no longer has any fluid loss control properties.

EXAMPLE B (drilling fluid)

A drilling fluid composed of 3 g/l of biopolymer, 2.7 g/l of crosslinked PVA (crosslinking rate: 0.27%) and 342 g/l of barite was prepared. The fluid loss (measured according to API method RP 13-B for high temperature, high pressure: 60° C. and 500 psi, i.e. 35 kg/cm$^2$) was 22 ml. With 5.4 g/l of CH-X-PVA, the fluid loss was only 14 ml.

EXAMPLE C (separating fluid or "spacer")

A separating fluid ("spacer") was prepared by adding a sodium silicate (6.6 g) and calcium chloride (7.7 g) to 291 g of water. Then, 58 g of a suspension of CH-X-PVA (PVA concentration in this suspension: 3.6% and crosslinking rate: 0.27%) were added. The fluid was weighted with barite (583 g). The PVA concentration was thus 0.23% per weight of fluid. Fluid loss control was measured for this separating fluid using the same test method as for the cement slurries: at 85° C. (185° F.), the fluid loss was 52 ml.

We claim:

1. A cement slurry comprising cement, water, and a chemically crosslinked polyvinyl alcohol formed by condensing polyvinyl alcohol in solution with a di- or polyfunctional crosslinking agent, the molar concentration of said crosslinking agent employed with respect to monomer residues of the polyvinyl alcohol being between about 0.01 and 1 percent.

2. The cement slurry of claim 1 wherein the chemically crosslinked polyvinyl alcohol is present in an amount of from 0.05 to 1 percent by weight of the cement.

3. The cement slurry of claim 1 wherein the molar concentration of said crosslinking agent with respect to the monomer residues of the polyvinyl alcohol is between 0.1 and 0.5 percent.

4. The cement slurry of claim 3 wherein the chemically

TABLE I (Example A)

| Test | Crosslinking rate (in %) | PVA concentration (in % BWOC) | Retarder concentration (in % BWOC) | Temperature °C. | °F. | Fluid loss (in ml/30 min) |
|---|---|---|---|---|---|---|
| 1* | 0.0 | 0.5 | 0 | 60 | 140 | >1000 |
| 2** | 0.19 | 0.5 | 0 | 60 | 140 | 20 |
| 3** | 0.19 | 0.25 | 0 | 60 | 140 | 50 |
| 4** | 0.19 | 0.5 | 0 | 85 | 185 | 58 |
| 5** | 0.19 | 0.25 | 0 | 85 | 185 | 64 |
| 6** | 0.19 | 0.125 | 0 | 85 | 185 | 108 |
| 7** | 0.19 | 0.5 | 0.25 | 85 | 185 | 46 |
| 8** | 0.19 | 0.5 | 0.25 | 100 | 220 | 36 |
| 9** | 0.29 | 0.5 | 0 | 85 | 185 | 34 |
| 10** | 0.29 | 0.5 | 0.25 | 85 | 185 | 52 |
| 11 | 0.15 | 0.35 | 0 | 60 | 140 | 180 |
| 12 | 0.21 | 0.35 | 0 | 60 | 140 | 112 |
| 13 | 0.29 | 0.35 | 0 | 60 | 140 | 30 |
| 14 | 0.25 | 0.25 | 0 | 60 | 140 | 66 |
| 15 | 0.27 | 0.25 | 0 | 60 | 140 | 31 |
| 16 | 0.27 | 0.15 | 0 | 60 | 140 | 52 |
| 17 | 0.27 | 0.10 | 0 | 60 | 140 | 144 |
| 18 | 0.27 | 0.15 | 0.5 | 60 | 140 | 32 |
| 19 | 0.27 | 0.15 | 0.5 | 85 | 185 | 62 |
| 20 | 0.27 | 0.12 | 0.5 | 85 | 185 | 76 |

*Test 1: comparative test
**Test 2–10: according to the invention (CH-X-PVA)

crosslinked polyvinyl alcohol is present in an amount of from 0.05 to 1 percent by weight of the cement.

5. The cement slurry of claim 1 wherein the crosslinking agent is selected from the group consisting of glyoxal, glutaraldehyde, maleic acid, oxalic acid, dimethylurea, polyacroleins, diisocyanates, divinyl sulphonate, and chlorides of diacids, and said crosslinking agent is capable of condensation at a pH of less than 10.

6. The cement slurry of claim 1 wherein the crosslinking agent is glutaraldehyde.

7. The cement slurry of claim 5 wherein the chemically crosslinked polyvinyl alcohol is present in an amount of from 0.05 to 1 percent by weight of the cement.

8. The cement slurry of claim 6 wherein the molar concentration of glutaraldehyde with respect to the monomer residues of the polyvinyl alcohol is between 0.1 and 0.5 percent.

* * * * *